United States Patent

Peeters

Patent Number: 5,519,687
Date of Patent: May 21, 1996

[54] TURNTABLE DEVICE FOR AN INFORMATION DISC

[75] Inventor: Hendrikus W. C. M. Peeters, Hapert, Netherlands

[73] Assignee: Optical Storage International Holland, Eindhoven, Netherlands

[21] Appl. No.: 154,826

[22] Filed: Feb. 11, 1988

[30] Foreign Application Priority Data

Mar. 26, 1987 [NL] Netherlands ............ 8700703

[51] Int. Cl.⁶ ............................................. G11B 17/028
[52] U.S. Cl. .................... 369/270; 369/271; 369/290; 369/282
[58] Field of Search ........................ 369/270, 271, 369/272, 280, 282, 290

[56] References Cited

U.S. PATENT DOCUMENTS

| | | | |
|---|---|---|---|
| 3,801,476 | 4/1974 | Rischmann et al. | 369/282 |
| 4,351,047 | 7/1982 | Redleah et al. | 369/270 |
| 4,587,617 | 5/1986 | Mak et al. | 369/270 |
| 4,658,393 | 7/1987 | Ohta et al. | 369/290 |
| 4,733,388 | 3/1988 | Fujimoto et al. | 369/270 |

Primary Examiner—Robert A. Weinhardt
Attorney, Agent, or Firm—Jack E. Haken

[57] ABSTRACT

Turntable (10) has a turntable bottom (19) and a turntable wall (20) which together define a locating space (21) in which the hub (7) of an information disc is engageable, and in which it is centered by means of a centering member (12) and clamped by magnetic clamping means. At the circumference of the locating space a centering wall (26) is provided, which wall has an inwardly sloping surface (27). The dimensions of the various parts, the field strength of the magnetic means and the coefficients of friction of the cooperating materials of the hub and the turntable are selected in such a way that, once an information disc has reached a position in which the free end of the centering member (22) has engaged the centering hole (17) of the information disc, the outer wall (28) of the hub (7) is situated above the sliding surface (27) of the turntable. The information disc is then automatically moved into the operating position under the influence of the magnetic forces exerted on it, which forces simultaneously cause the edge of the centering hole (17) to slide over the precentering surface (23) of the centering member (22) and the edge of the hub (7) to slide over the sliding surface (27).

6 Claims, 3 Drawing Sheets

TURNTABLE DEVICE FOR AN INFORMATION DISC

BACKGROUND OF THE INVENTION

The invention relates to a turntable device for centering, magnetically clamping and in an operation position rotating a flat round information disc about an axis of rotation. The disc is provided with a central hub having magnetically attractable portions, a substantially cylindrical outer wall, and a central centering hole. The device includes a turntable having a turntable bottom which extends transversely of the axis of rotation and having a coaxial cylindrical turntable wall, which turntable bottom and turntable wall define a locating space for engagement with the hub of the information disc. A coaxial centering member is centered in the locating space and engageable in the centering hole of the information disc. The centering member has a free end with a pre-centering surface adapted to cooperate with the wall of the centering hole of the information disc in a not yet fully centered condition, and magnetic clamping means on the bottom of the turntable which are adapted to cooperate with the magnetically attractable portions of the hub via an air gap.

A turntable device of the type intended above is described in the Applicant's earlier European Patent Applications 0,117,576 A1 and 0,118,146 A1 (U.S. application Ser. No. 490,801 and U.S. Pat. No. 4,510,508, respectively, herewith incorporated by reference). The turntable device is capable of providing excellent centering and clamping of an information disc without any further means, such as a disc-pressure means, being needed. By accurately machining the centering member—which may be the end portion of a motor spindle—and accurately machining the center hole in the hub the currently used machining techniques enable such an accurate fit to be realised that the stringent centricity requirements imposed by modern information-disc systems, such as systems operating with optical information discs, can be met. Both the hub and turntable device need have only a small axial dimension. It is important that the mounting height of an apparatus comprising the turntable device is not enlarged unnecessarily. The turntable devices and the associated information discs of the type described are suitable for systems in which the information disc is contained in a cassette and in which the information disc must be rotatable inside the cassette housing. It is often required that the cassette can be inserted through a slot-like opening in the front of the apparatus, after which the drive means and the information disc must be made to cooperate with each other. This requires a small axial displacement of the information disc and the turntable device towards each other. The use of a hub on the information disc has the advantage that the distance between the information disc inside the cassette housing and the turntable device is already bridged at least partly by the hub.

A disadvantage of said and other known turntable devices is that a correct cooperation between the information disc and the turntable device is not obtained unless the user has already brought the information disc in a comparatively accurately central position above the turntable before these are axially moved towards each other. This is because the comparatively large axial magnetic force exerted between the hub of the information disc and the turntable gives rise to normal forces which are so large that considerable friction occurs, which may impede a further radial movement of the information disc to a central position.

SUMMARY OF THE INVENTION

It is the object of the invention to provide a turntable device which is highly self-centering. This is to be understood to mean that the turntable device is constructed in such a way that even if the information disc is placed on the turntable in a comparatively eccentric position automatically the information disc is centred and clamped correctly without any further exernal force being applied. To this end a centering wall of the turntable is situated at the circumference of the locating space, which wall at its side which is remote from the turntable bottom has an annular sliding surface which slopes inwardly from its outer circumference towards the turntable bottom. The dimensions of said parts, field strength of the magnetic means, and the coefficients of friction of the materials of the hub and the turntable device which cooperate with each other during centering of the information disc are such that, once an information disc has reached a position in which the pre-centering surface of the centering member has engaged the centering hole of the information disc, the outer wall of the hub of the information disc is situated above the sliding surface and the information disc is automatically movable into the operating position under the influence of the magnetic forces exerted on it. These forces simultaneously cause the edge of the centering hole to slide over the pre-centering surface of the centering member and the edge of the hub to slide over the sliding surface.

Thus, by a suitable choice of materials and hence of friction coefficients, magnetic forces and shapes when an information disc is placed on the turn table device in a highly eccentric position, at least in comparison with the permissible clearance of the centering member in the centering hole of the hub, is nevertheless moved automatically to the desired position by the magnetic forces. The advantages of the invention become apparent in particular when the turntable device is used in an apparatus into which the information disc is inserted through an insertion slot, after which the disc is no longer accessible to the user. The information disc can be arranged in the housing of a cassette with a comparatively large clearance and is yet very likely to assume the correct position on the turntable device. A requirement is that the cassette housing is so positioned in the apparatus that the hub of the information disc is situated within the range of maximum permissible eccentricity. The substantial extension of this range provided by the turntable device in accordance with the invention enables a correct cooperation with information discs in cassettes to be achieved.

As already stated, it is favourable if only a small axial displacement is needed to make the turntable device and the information disc cooperate with each other. An embodiment of the invention which is favourable in this respect is characterized in that the free end of the centering member is situated closer to the turntable bottom than the upper edge of the sliding surface. This means a small penetration depth, so that a small axial displacement is adequate. However, this also has a very important additional advantage. In turntable devices in accordance with this embodiment it is possible to obtain an automatic centering of the information disc on the turntable under the influence of magnetic forces, even when the information disc is placed on the turntable in such an eccentric position that the centering member is not yet situated inside the centering hole of the hub. The reason for this is that owing to the oblique position of the information disc on the turntable device the magnetic forces act in such a way that the disc experiences a force component which is directed towards the centre of the turntable.

It is found that a suitable turntable device can be constructed utilizing a further embodiment, which is characterized in that the centering wall is constituted by a plastics ring surrounded by the cylindrical turntable wall. Such a ring can be manufactured easily. In combination with the material used for the hub of the information disc this enables a comparatively low coefficient of friction to be obtained.

A further embodiment of the invention is characterized in that: the magnetic clamping means comprise a plurality of identical axially magnetized permanent magnets; a soft-magnetic ring is fixedly connected to the turntable bottom; there is provided a holder connected to the turntable, which holder has a plurality of recesses which correspond in size to the permanent magnets, which are regularly spaced on a circle, and which are situated above the soft-magnetic ring; and the permanent magnets are mounted in the recesses and are connected to the soft-magnetic ring by magnetic clamping forces. An advantage of this embodiment is that it enables the same permanent magnets, if necessary in different numbers, to be used for different turntable devices. The permanent magnets can be mounted by simply dropping them into that recesses, so that mounting proceeds quickly. For an effective magnetic action the permanent magnets are preferably axially magnetized and mounted in adjacent recesses with alternately opposite directions of magnetization. It may be advantageous to integrate the centering wall and the holder to form a single plastic part.

DETAILED DESCRIPTION OF THE PREFERRED EMBODIMENT

Figure 1:
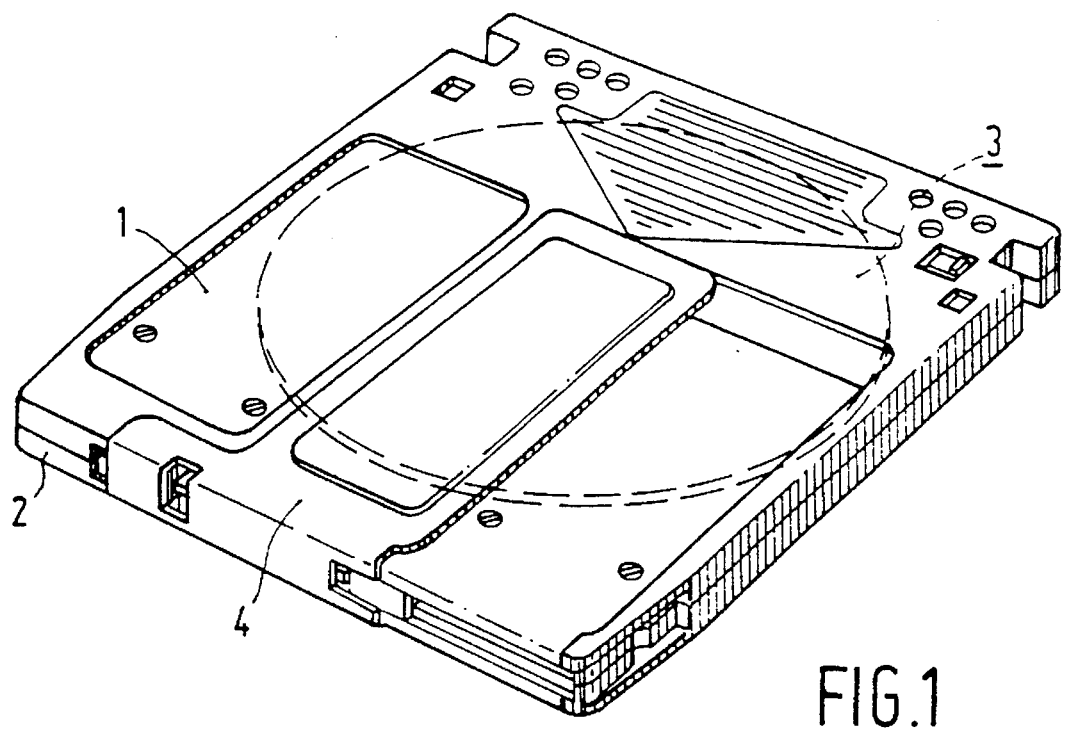
FIG. 1 is a perspective view of a cassette containing an optical information disc.
Figure 2:
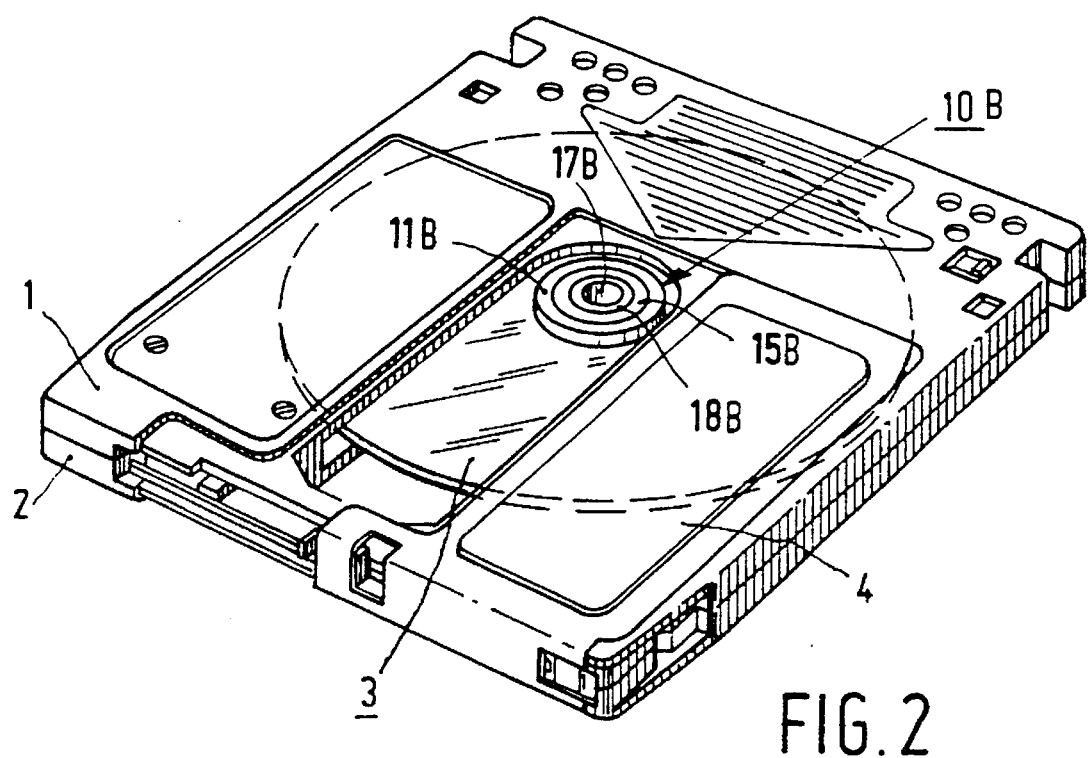
FIG. 2 is a view similar to that of FIG. 1, showing the cassette with one shutter open.
Figure 3:
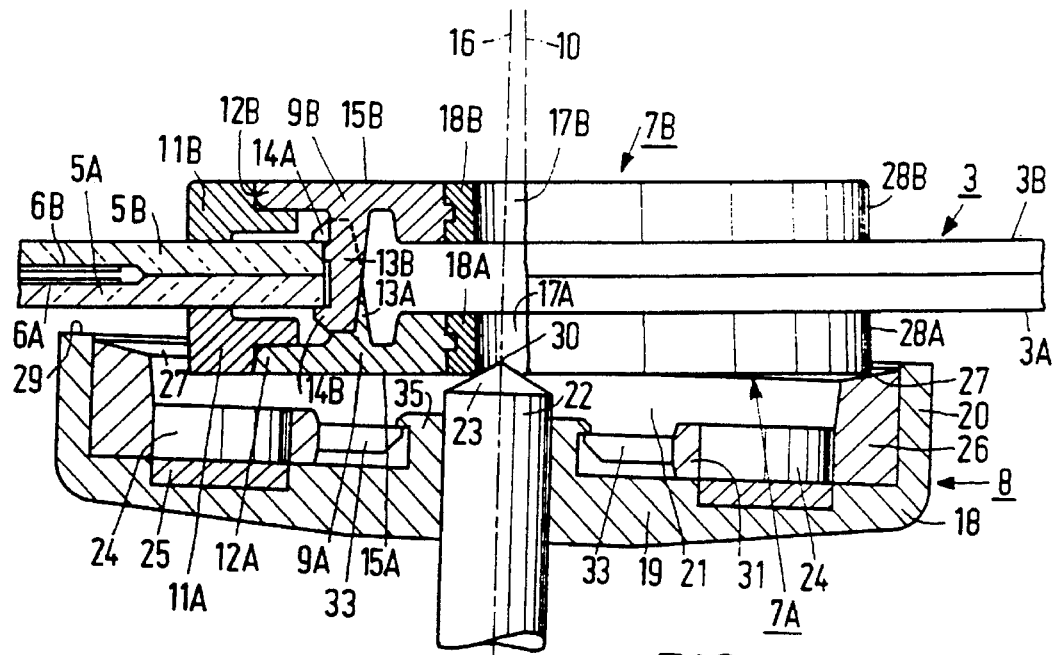
FIG. 3 is a cross-sectional view of a turntable device and the central part of an information disc in a pre-centred position on said device.

The cassette shown in FIGS. 1 and 3 is a cassette as described in the Applicant's earlier Netherlands Patent Application no. 8603060 (to which U.S. application Ser. No. 111,900 corresponds), herewith incorporated by reference), which has not been published in due time. It is to be noted that the cassette comprises a first cassette section 1 and a second cassette section 2, which together constitute a box-shaped enclosure for the information disc 3. This disc has a certain clearance inside the cassette, so that it can be rotated inside the cassette by suitable means after a slidable shutter 4 has been opened. The shutter 4 exposes a slot in the wall, so that a drive spindle can cooperate with the information disc and write and/or read means, such as for example magnetic heads or an optical head, can be brought in the proximity of the rotating information carrier.

Information disc 3 has a first side 3A which should face a drive means and an opposite second side 3B. There are two discs 5A and 5B respectively. The two discs are made of a transparent plastics and have an information surface 6A and 6B respectively. The disc is an optically readable and inscribable recordable information disc. The information surfaces are covered with an optically modifiable layer. The two discs contact each other only at the central portion and at the periphery. In the central portion a central hole is formed through both discs.

For the purpose of centering and clamping the information carrier 3 a hub is provided, which may be regarded as a combination of two hubs 17A and 17B, one for each of the discs. The hubs serve for centering and clamping the information disc on the turntable device 8. They are provided with first centering means 9A and 9B respectively adapted to cooperate with the inner wall of the central hole of the information disc to centre the hubs relative to the central axis of the discs, which axis is indicated by the broken line 10. Further, there are provided second centering means 11A and 11B respectively, for centering the hubs and hence the information carrier relative to the turntable device. At the side of the information carrier each hub is provided with a flange-like portion 12A and 12B respectively.

The first centering means 9A and 9B comprise resilient limbs 13A and 13B respectively, which act resiliently against the inner wall of the central hole in radial directions and which serve for the purpose of centering and also function as clamping means, to pretension the associated flange-like portion of each hub by cooperation with the facing side of the information disc. The limbs 31A, 13B have cross-sectionally hook-shaped end portions 14A and 14B respectively. The hook-shaped end portions 14A engage behind the disc 5B and the hook-shaped end portions 14B engage behind the disc 5A.

The limbs 13A form part of a single integrated plastics part 15A. Similarly, the limbs 13B belong to a single integrated plastics part 15B. The limbs 13A extend in substantially axial directions and are disposed at some distance from the edge of the flange-like portion 12A, so that they are axially movable into the end positions by exerting force directed in accordance with the axis 10 on the portions of the integrated part which are situated nearer the axis. In the assembled condition the resilient limbs 13A are constantly subject to a tensile force as a result of the elasticity of the flange-like portion. In a similar way the integrated part 15B comprises a deflexible flange-like portion 12B and the limbs 13B constantly experience a tensile force in the assembled condition. The two discs 5A and 5B are thus drawn towards one another by the hubs, which helps to keep the two discs in the assembled condition. Each of the hubs 7A and 7B comprises a magnetisable clamping ring constituted by said means 11A and 11D. These means are clamped between the integrated parts 15A and 15B and the discs 4A and 4B respectively as separate parts.

Figure 4:
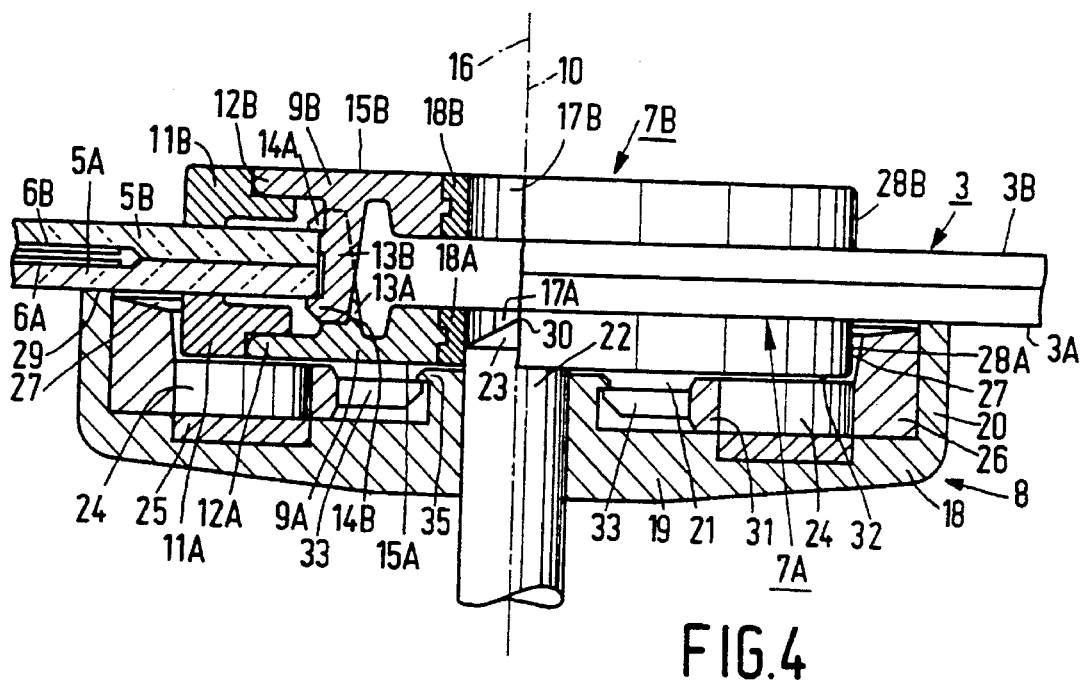
FIGS. 4 and 5 are plan views of the turntable device of FIG. 3.

The turntable device, see FIGS. 3 and 4, serves for centering, magnetically clamping and rotating the information disc 3 in an operating position about the axis of rotation 16. Said second centering means 11A and 11B are of magnetically attractable metal for the purpose of magnetically clamping the information disc on the turntable device. The hubs 7A and 7B comprise a substantially cylindrical outer wall and the integrated parts 15A and 15B are each formed with a separate central centering hole 17A and 17B respectively formed in metal sleeves 18A and 18B respectively. In principle, the centering holes 17A and 17B will not be coaxial because the information disc 3 is assembled from two discs 5A and 5B which are secured to each other and relative to which the integrated parts 15A and 15B are centred. However, in practice the differences will be so small that they cannot be indicated in the drawing, so that for simplicity it is assumed that the two centering holes have a common central axis 10.

The turntable device 8 comprises a turntable 18 having a turntable bottom 19 which extends transversely of the axis of rotation 16 and having a coaxial cylindrical turntable wall 20. The turntable is made of a suitable, stable and form-retaining material such as a metal, for example a zinc alloy. The turntable bottom and the cylindrical turntable wall together define a locating space 21 for engagement with the hubs <u>7A</u>, <u>7B</u> of the information carrier. A coaxial centering member 21 is centred in the space 21. This centering member is engageable in a centering hole 17A or 17B of the information carrier. The centering member has a free end portion with a pre-centering surface 23 which is adapted to cooperate with the centering holes 17A and 17B in the information carrier in the not yet fully centred condition, as is illustrated in FIG. 3. The turntable device further comprises magnetic clamping means 24 and 25 on the bottom of the turntable, which means are constructed to cooperate with the magnetically attractable parts 11A and 11B of the information carrier via an air gap 32.

At the circumference of the locating space 21 a centering wall 26 is situated. At its side which is remote from the turntable bottom 19 this wall has an annular sliding surface 27 which slopes inwardly from the outer circumference towards the turntable bottom. The dimensions of these various parts, the field strength of the magnetic means, and the friction coefficients of the materials of the hubs 7A and 7B and of the turntable device <u>8</u> which cooperate with one another during centering of the information carrier are selected in such a way that, once an information carrier <u>3</u> has reached a position as shown in FIG. 3, in which the free end of the centering member 22 has engaged a centering hole 17A or 17B of the information carrier, the outer wall 28A or 28B of the hub of the information disc is disposed above the sliding surface 27 and the information disc is moved automatically into the operating position under the influence of the magnetic forces exerted on it. These forces simultaneously cause the edge of the centering hole 17A or 17B to slide over the pre-centering surface 23 of the centering member 22 and the edge of the hub <u>7A</u> or <u>7B</u> to slide over the sliding surface 27. In the situation illustrated in FIG. 3 this means that the information carrier <u>3</u> is moved to the left under the influence of the magnetic forces. The operating position is reached when the centering member 22 can engage the centering hole 17A, at which instant the axis 10 coincides with the axis of rotation 16 of the turntable device and the disc 5A rests on the upper edge 29 of the cylindrical wall 20 of the turntable <u>18</u>. This situation is illustrated in FIG. 4.

As is apparent in particular from FIG. 4, the free end of the centering member 22 is situated nearer the turntable bottom 19 than the upper edge of the sliding surface 27. This difference in level is even such that when the tip 30 of the centering member 22 is situated almost, but not yet, inside a centering hole of the information carrier, the information carrier already occupies such an inclined position on the turntable device that it is automatically moved further in the centering direction under the influence of the magnetic forces. These steps provide an excellent automatic self-centering action, whilst it is also achieved that the centering member only penetrates the hub of the information carrier over a minimal distance. Therefore, a minimal axial displacement of the information disc relative to the turntable device is adequate to attain the operating situation illustrated in FIG. 4.

The centering wall 26 is constituted by a plastics ring which is surrounded by the cylindrical turntable wall 20. The upper edge of the sliding surface 27 is situated slightly below the upper edge 29 of the turntable wall 20, which ensures that the in the operating position, see FIG. 4, the information carrier 3 is supported by the upper edge 29. This guantees a well-defined position of the disc on the turntable, perpendicular to the axis of rotation 16.

Figure 5:
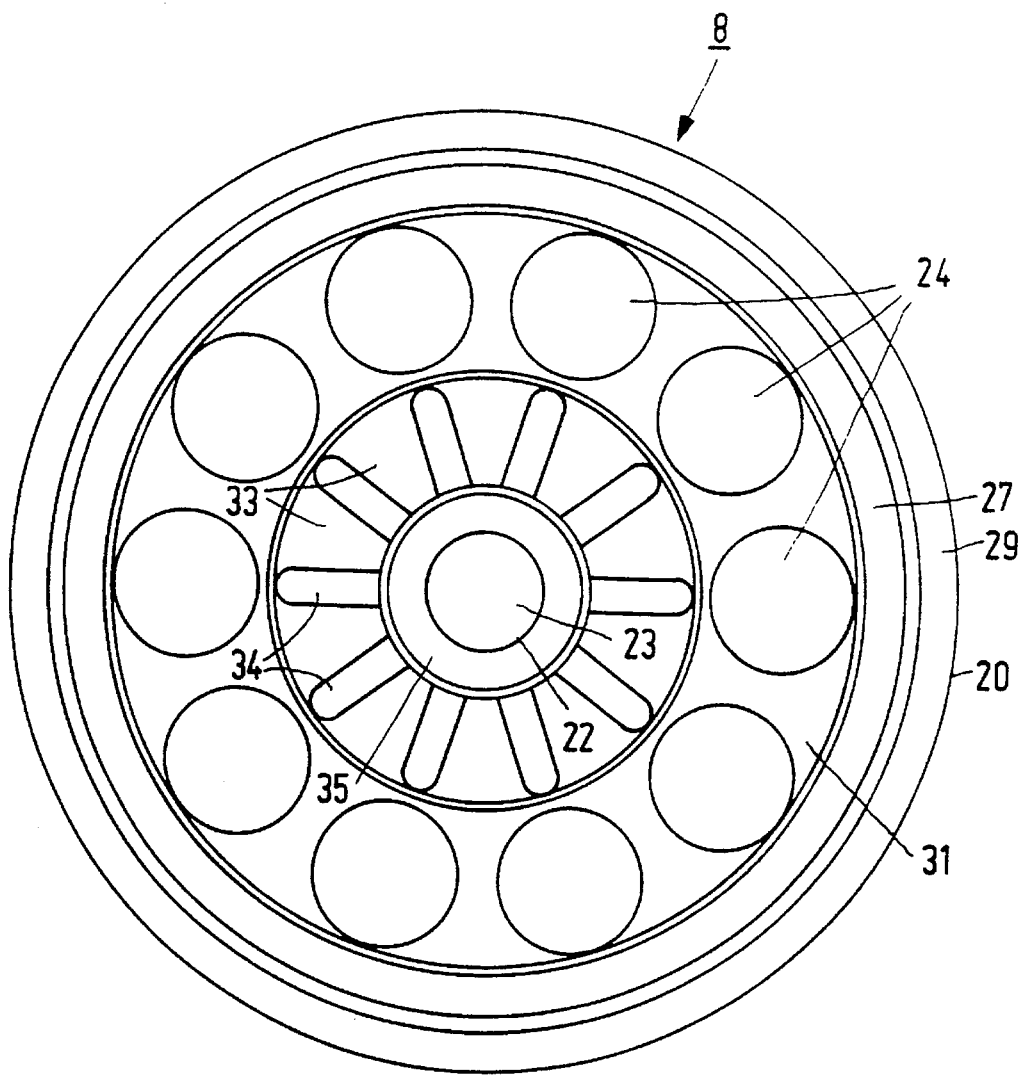

The magnetic clamping means 24 comprise a plurality of identical axially magnetised permanent magnets, see in particular FIG. 5. The magnetic clamping means 25 comprises a soft-magnetic ring which is secured to the turntable bottom 19, for example by gluing or another suitable method. The magnets are mounted in recesses in a holder 31 which is connected to the turntable 18. For this purpose the holder is formed with recesses which are of the same size as the permanent magnets and which are regularly spaced on a circle in such a way that the permanent magnets are situated above the soft-magnetic ring 25. The permanent magnets are mounted in the holder in such a way that the north-south orientation points alternately upwards and downwards. The soft-magnetic ring 25 short-circuits the magnetic-flux lines at the side facing the turntable bottom 19. At the upper side the permanent magnets cooperate with the magnetically attractable ring 11A or 11B via the air gap 32, see FIG. 4. The permanent magnets are connected to the soft-magnetic ring exclusively by their own magnetic clamping force but may be connected additionally to the ring in a suitable way, for example by gluing.

The centering wall 26 and the holder 31 belong to a single plastics part. As can be seen in particular in FIG. 5, this part comprises a plurality of centrally disposed resilient lugs 33 which are spaced from each other by slots 34. During mounting the lugs 33 are axially deformed, so that they engage underneath an annular collar 35 of the turntable <u>18</u> and thus connect the plastics part to the turntable.

A combination of an information carrier and a turntable device as shown in FIGS. 3 and 4 has been built and tested in practice. The information carrier had a diameter of 130 mm and a thickness of 2,8 mm. The hubs had a diameter of 25 mm and a thickness of 2.2 mm. The centre holes of the hubs had a diameter between 4.004 and 4.012 mm. The air gap between the hub and permanent magnet was 0.2 mm in the operating position. The magnetically attractable ring was made of stainless steel comprising 16% Cr, 1% Mn, 1% Si and 0.1% C in accordance with DIN 17440. The metal sleeves with the centre holes were made of stainless steel comprising 18% Cr, 8% N1 and 2% Mn in accordance with DIN 17440. The centering member of the turntable device had a diameter between 3,998 and 4.000 mm. The sliding surface of the plastics part was made of polyacetal and was inclined at an angle of 20 degrees to the axis of rotation. The free end of the centering member was situated 0.4 mm below the supporting edge of the turntable and the precentering surface was constituted by a conical surface having an apex angle of 120 degrees.

The permanent magnets had a diameter of 5 mm and a thickness of 2 mm and were constituted by samarium/cobalt magnets short-circuited by a soft-iron ring. The flux emerging from the magnet system was roughly $108 \times 10^{-6}$ Weber and the inductance in the operating condition 1.2 Tesla.

It was found that with such a combination automatic positioning of the information disc is possible with an initial eccentricity larger than 2 mm, i.e. larger than the radius of the centering member. This means that in the initial position the free end of the centering member, is not yet situated in the central hole of the hub of the information disc. The eccentricity range within which automatic centering is obtained is thus situated within a circle having a diameter larger than the diameter of the central hole, in the case described here even a diameter larger than 5 mm. The clamping force of the magnetic means in the operating position is approximately 25 Newtons, which is amply sufficient for the present purpose.

Although the invention has been described only for a single embodiment, numerous modifications are possible within the scope of the invention. The turntable device as shown in FIGS. 3 to 5 is not only suitable for cooperation with an optical information carrier of the type shown but it is also suitable for centering and clamping information discs of an entirely different kind, for example magnetic information discs or magneto-optical information discs. The hub of the information disc may be of a totally different construction than that shown in the drawings. Suitable hub constructions are described in, for example, U.S. Pat. No. 4,660,118 (herewith incorporated by reference) and European Patent Application 0,117,57A1 (U.S. application Ser. No. 490,801). The turntable device itself may also be of an entirely other construction than shown. For example, the turntable 18 may comprise a plurality of parts instead of a single part. Alternatively, the turntable 18 and the centering wall 26 may be integrated to form a single part. In the embodiment shown the centering member 22 is constituted by the end portion of the motor spindle of an electric motor, not shown. However, in principle it is also possible to utilize a different type of centering member which, unlike the embodiment shown, need not be circularly cylindrical but which may be, for example, star-shaped. Although it may be advantageous—in particular when it is desired to manufacture turntable devices of different types and dimensions with standard parts—to use a plurality of identical permanent magnets 24, it is also possible to use an annular magnet which is designed and optimised for the relevant application, for example made of ferrordure or a resin-bonded magnet material. Generally it will be advantageous if the turntable device is provided with permanent magnets and the hub of the information disc is provided with a magnetically attractable metal ring or disc. However, in principle this situation may be reversed, Moreover, it is possible to use electromagnets instead of permanent magnets.

Further advantages of the invention, not yet mentioned, may be obtained depending on the embodiment used and the purpose for which it is to be used. Further advantages of the invention may become apparent when the turntable device in accordance with the invention is compared with turntable devices other than the aforementioned known device.

What is claimed is:

1. A turntable device (8) for centering, magnetically clamping and in an operating position rotating a flat round information disc (3) about an axis of rotation (16), which disc is provided with a central hub (7A, 7B) comprising magnetically attractable portions (11A, 11B) and having a substantially cylindrical outer wall (28A, 28B) and a central centering hole (17A, 17B), which device comprises:

a turntable (18) having a turntable bottom (19) which extends transversely of the axis of rotation (16) and having a coaxial cylindrical turntable wall (20), which turntable bottom and turntable wall define a locating space (21) for engagement with the hub (7A,7B) of the information disc (3), a coaxial centering member (22) which is centred in the locating space (21) and which is engageable in the centering hole (17A, 17B) of the information disc, which centering member has a free end comprising a pre-centering portion having a pre-centering surface (23) which is adapted to cooperate with the wall of the centering hole (17A, 17B) of the information disc in a not yet fully centred condition, and magnetic clamping means (24, 25) on the bottom of the turntable which are adapted to cooperate with the magnetically attractable portions of the hub via an air gap, characterized in that a centering wall (26) of the turntable is situated at the circumference of the locating space (21), which wall at its side which is remote from the turntable bottom (19) has an annular sliding surface (27) which slopes inwardly from its outer circumference towards the turntable bottom, and the dimensions of the said parts, the field strength of the magnetic means and the coefficients of friction of the materials of the hub (7A, 7B) and the turntable device (8) which cooperate with each other during centering of the information disc are such that, once an information disc (3) has reached a position in which the pre-centering surface (23) of the centering member (22) has engaged the centering hole (17A, 17B) of the information disc, the outer wall (28A, 28B) of the hub of the information disc is situated above the sliding surface (27) and the information disc is automatically movable into the operating position under the influence of the magnetic forces exerted on it, which forces simultaneously cause the edge of the centering hole (17A, 17B) to slide against the pre-centering surface (23) of the centering member (22) and the edge of the hub (7A, 7B) to slide against the sliding surface (27).

2. A turntable device as claimed in claim 1, characterized in that the free end of the centering member (22) is situated closer to the turntable bottom (19) than the upper edge of the sliding surface (27).

3. A turntable device as claimed in claim 1, characterized in that the centering wall (26) is constituted by a plastics ring surrounded by the cylindrical turntable wall (20).

4. A turntable device as claimed in claim 3, characterized in that the magnetic clamping means comprise a plurality of identical axially magnetised permanent magnets (24), a soft-magnetic ring (25) which is fixedly connected to the turntable bottom (19), there is provided a holder (31) connected to the turntable (18), which holder has a plurality of recesses which correspond in size to the permanent magnets (24), which are regularly spaced on a circle, and which are situated above the soft-magnetic ring (25), and the permanent magnets (24) are mounted in the recesses and are connected to the soft-magnetic ring by magnetic clamping force.

5. A turntable device as claimed in claim 4, characterized in that the centering wall (26) and the holder (31) are integrated to form a single plastic part.

6. A disc drive device comprising:

a center spindle engagable in a center opening formed in a disc hub mounted to the center of one surface of a disc; and a disc table including a disc supporting section provided so as to support the one surface of the disc and be concentric and rotatable together with said center spindle, said disc supporting section being further provided so as to project beyond a forward end of said center spindle and said disc table further including a guide section provided so as to cooperate with the disc hub and adjoin said disc supporting section.

\* \* \* \* \*